(12) United States Patent
Sugiyama et al.

(10) Patent No.: US 11,392,439 B2
(45) Date of Patent: *Jul. 19, 2022

(54) PROGRAM AND INFORMATION PROCESSING APPARATUS

(71) Applicant: Brother Kogyo Kabushiki Kaisha, Nagoya (JP)

(72) Inventors: Takashi Sugiyama, Okazaki (JP); Tomoki Nakamura, Kasugai (JP); Kodai Mizuno, Anjo (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/752,207

(22) Filed: Jan. 24, 2020

(65) Prior Publication Data

US 2020/0159608 A1 May 21, 2020

Related U.S. Application Data

(63) Continuation of application No. 16/046,200, filed on Jul. 26, 2018, now Pat. No. 10,579,456, which is a
(Continued)

(30) Foreign Application Priority Data

Mar. 29, 2013 (JP) .................................. 2013-072371

(51) Int. Cl.
*G06F 11/00* (2006.01)
*G06F 11/07* (2006.01)
(Continued)

(52) U.S. Cl.
CPC ......... *G06F 11/0766* (2013.01); *G03G 15/55* (2013.01); *G06F 3/1207* (2013.01);
(Continued)

(58) Field of Classification Search
CPC ................. G06F 11/0766; G06F 11/0733
See application file for complete search history.

(56) References Cited

U.S. PATENT DOCUMENTS

| 7,011,386 B2 | 3/2006 | Iwasaki et al. |
| 7,933,032 B2 * | 4/2011 | Funahashi ............ G06K 15/00 358/1.14 |

(Continued)

FOREIGN PATENT DOCUMENTS

| JP | 2000-293342 A | 10/2000 |
| JP | 2000-293344 A | 10/2000 |

(Continued)

OTHER PUBLICATIONS

Canon, Displaying the Printer Status Window, 2012, https://hk.canon/en/support/8201587100, 4 pages (Year: 2012).*

(Continued)

*Primary Examiner* — Katherine Lin
(74) *Attorney, Agent, or Firm* — Banner & Witcoff, Ltd.

(57) ABSTRACT

A non-transitory computer-readable medium has a program stored thereon and readable by a processor of an information processing apparatus configured to communicate with an image processing apparatus. The program, when executed by the processor, causes the information processing apparatus to perform: receiving an execution request to cause the image processing apparatus to perform the image processing, the execution request corresponding to a job; acquiring status information indicating a status of the image processing apparatus; and providing notification, during a notification time period, of error information based on the status information when the status information is acquired during the notification time period, which starts at a time when the execution request is received.

7 Claims, 7 Drawing Sheets

Related U.S. Application Data continuation of application No. 14/227,075, filed on Mar. 27, 2014, now Pat. No. 10,037,236.

(51) Int. Cl.
  *G03G 15/00* (2006.01)
  *G06F 3/12* (2006.01)
  *G06K 15/00* (2006.01)

(52) U.S. Cl.
  CPC .......... *G06F 3/1229* (2013.01); *G06F 3/1259* (2013.01); *G06F 3/1286* (2013.01); *G06F 11/0733* (2013.01); *G06K 15/402* (2013.01)

(56) References Cited

U.S. PATENT DOCUMENTS

| | | | |
|---|---|---|---|
| 8,427,681 | B2 | 4/2013 | Kotake |
| 2002/0140963 | A1 | 10/2002 | Otsuka |
| 2009/0222605 | A1 | 9/2009 | Morozumi |
| 2009/0303532 | A1 | 12/2009 | Ito |
| 2010/0079300 | A1 | 4/2010 | Agata |
| 2010/0265538 | A1 | 10/2010 | Kotake |
| 2011/0035625 | A1 | 2/2011 | Kanamori |
| 2011/0149323 | A1 | 6/2011 | Kawaura |
| 2013/0019128 | A1 | 1/2013 | Yamasaki et al. |
| 2014/0169854 | A1 | 6/2014 | Park et al. |
| 2014/0198346 | A1 | 7/2014 | Kawaura |

FOREIGN PATENT DOCUMENTS

| | | |
|---|---|---|
| JP | 2010-157929 A | 7/2010 |
| JP | 2010-250660 A | 11/2010 |
| JP | 2011-128904 A | 6/2011 |

OTHER PUBLICATIONS

Dec. 1, 20163—(JP) Notification of Reasons for Refusal—App 2013-072371, Eng Tran.

Apr. 1, 20171—(JP) Notification of Reasons for Refusal—App 2013-072371, Eng Tran.

\* cited by examiner

PROGRAM AND INFORMATION PROCESSING APPARATUS

CROSS-REFERENCE TO RELATED APPLICATION

This application is a continuation of prior U.S. application Ser. No. 16/046,200, filed Jul. 26, 2018, which is a continuation of prior U.S. application Ser. No. 14/227,075, filed Mar. 27, 2014 (now U.S. Pat. No. 10,037,236), which claims priority from Japanese Patent Application No. 2013-072371 filed on Mar. 29, 2013, the entire subject matter of which is incorporated herein by reference.

TECHNICAL FIELD

This disclosure relates to a program and an information processing apparatus. More specifically, this disclosure relates to an error notification technology of providing notification of error information such as content of an error and a method of coping with the error.

BACKGROUND

In an image processing apparatus that performs an image processing operation such as printing and scanning, a variety of errors occur, and disable the image processing operation (to perform), such as paper jam, out-of-sheet, and colorant-deficiency, etc. There is a known technology of sending error information to an information processing apparatus communicating with the image processing apparatus.

SUMMARY

However, the above technology has the following problem. That is, the error information may be unnecessary for the information processing apparatus having received the error information. For example, the error information regarding printing function in the image processing apparatus, such as colorant deficiency and paper jam, is not useful to a user of the information processing apparatus, which has not sent a print job to the image processing apparatus. In this case, the user may be rather uncomfortable due to the error notification.

In view of the above, this disclosure provides at least an error notification technology capable of appropriately providing notification of an error to each information processing apparatus communicating with an image processing apparatus.

A non-transitory computer-readable medium of this disclosure has a program stored thereon and readable by a processor of an information processing apparatus configured to communicate with an image processing apparatus. The program, when executed by the processor, causes the information processing apparatus to perform: receiving an execution request to cause the image processing apparatus to perform the image processing, the execution request being corresponding to a job; acquiring status information indicating a status of the image processing apparatus; and providing notification, during a notification time period, of error information based on the status information when the status information is acquired during the notification time period, which starts at a time when the execution request is received.

An information processing apparatus of this disclosure includes a communication unit that communicates with an image processing apparatus performing image processing, and a control unit. The control unit executes: receiving an execution request to cause the image processing apparatus to perform the image processing, the execution request being corresponding to a job; acquiring status information indicating a status of the image processing apparatus; and proving notification, during a notification time period, of error information based on the status information when the status information is acquired during the notification time period, which starts at a time when the execution request is received.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, an illustrative embodiment embodying an apparatus of this disclosure will be specifically described with reference to the accompanying drawings. In this illustrative embodiment, this disclosure is applied to an image processing system having a multi-functional peripheral (MFP) and a personal computer (PC) having a device driver for the MFP installed therein.

[Configuration of Image Processing System]

Figure 1:
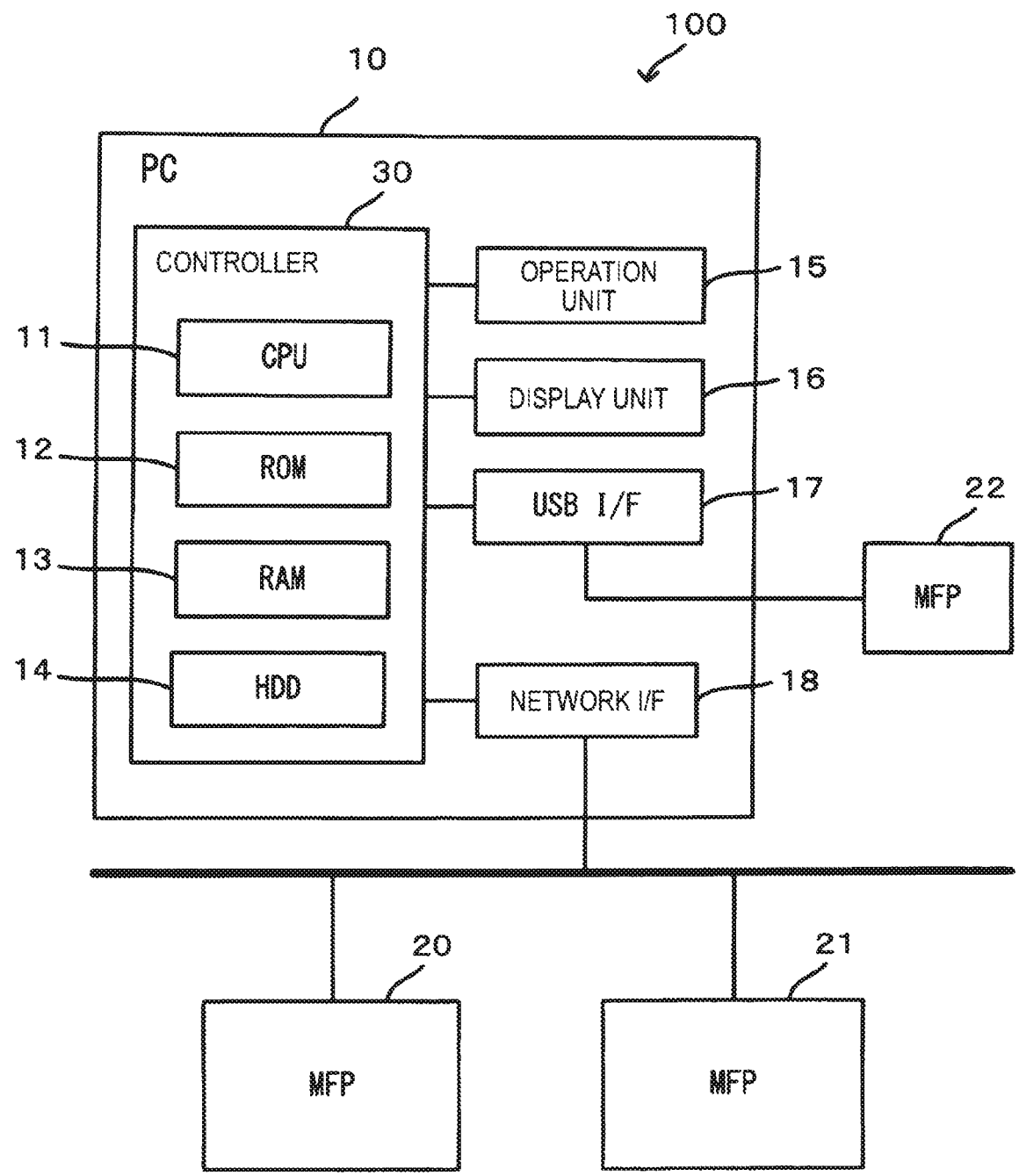
FIG. 1 is a block diagram illustrating a configuration of an image processing system according to an illustrative embodiment.

As shown in FIG. 1, an image processing system 100 of this illustrative embodiment has MFPs 20 (an example of the printing apparatus), 21, 22 and a PC 10 (an example of the information processing apparatus) that controls the MFPs. In the image processing system 100, the PC 10 and the MFPs 20, 21 are connected to communicate with each other through a wired LAN cable, and the PC 10 and the MFP 22 are connected to communicate with each other through a USB cable.

In the meantime, the image processing apparatus and the information processing apparatus configuring the image processing system 100 are not limited to the shown apparatuses. Also, the connection between the PC 10 and the MFP 20 and the like is not limited to the wired LAN cable and the USB cable and may be made through a serial communication cable, a parallel communication cable and wireless communication such as wireless LAN.

The PC 10 has a controller 30 (an example of the control unit) having a CPU 11 (an example of the control unit) that executes a variety of processing, a ROM 12 that stores therein a startup processing program (BIOS), which is executed by the CPU 11 upon startup of the PC 10, and the like, a RAM 13 that is used as a temporary storage area when the CPU 11 executes the variety of processing and a hard disk drive (HDD) 14 that stores therein a variety of programs and data.

Also, the PC 10 has an operation unit 15 such as a keyboard, a mouse and the like, a display unit 16 such as a liquid crystal monitor and the like, a USB interface 17 (an example of the communication unit) and a network interface 18 (an example of the communication unit), which are electrically connected to the controller 30 and are controlled by the controller 30.

The PC 10 stores therein an operating system (OS), application programs (document processing software, drawing software, spreadsheet software, photograph data editing software and the like), device drivers for controlling the MFPs 20, 21, 22 and a status monitor (an example of the program) that monitors a status of each MFP 20. In the meantime, the various programs may be installed by using a recording medium having the programs recorded therein, such as CD-ROM, or may be downloaded and installed from a server on a network.

The MFP 20 has a function of forming an image on a sheet and an electrophotographic method, an inkjet method and the other general image forming methods may be adopted as the image forming method. Also, the MFP may form a color image and a monochrome image or may form only a monochrome image. In addition, the MFP 20 has image reading, FAX transmission and FAX reception functions. The configurations of the MFPs 21, 22 are similarly to the MFP 20.

[Operations of PC]

Subsequently, operations of the PC 10, which are performed when the MFP 20 is enabled to perform a printing operation in the image processing system 100 of this illustrative embodiment, are described with reference to a block diagram of FIG. 2. In the meantime, a graphic engine 51 and a spooler 52 of FIG. 2 are provided as parts of the OS.

Figure 2:
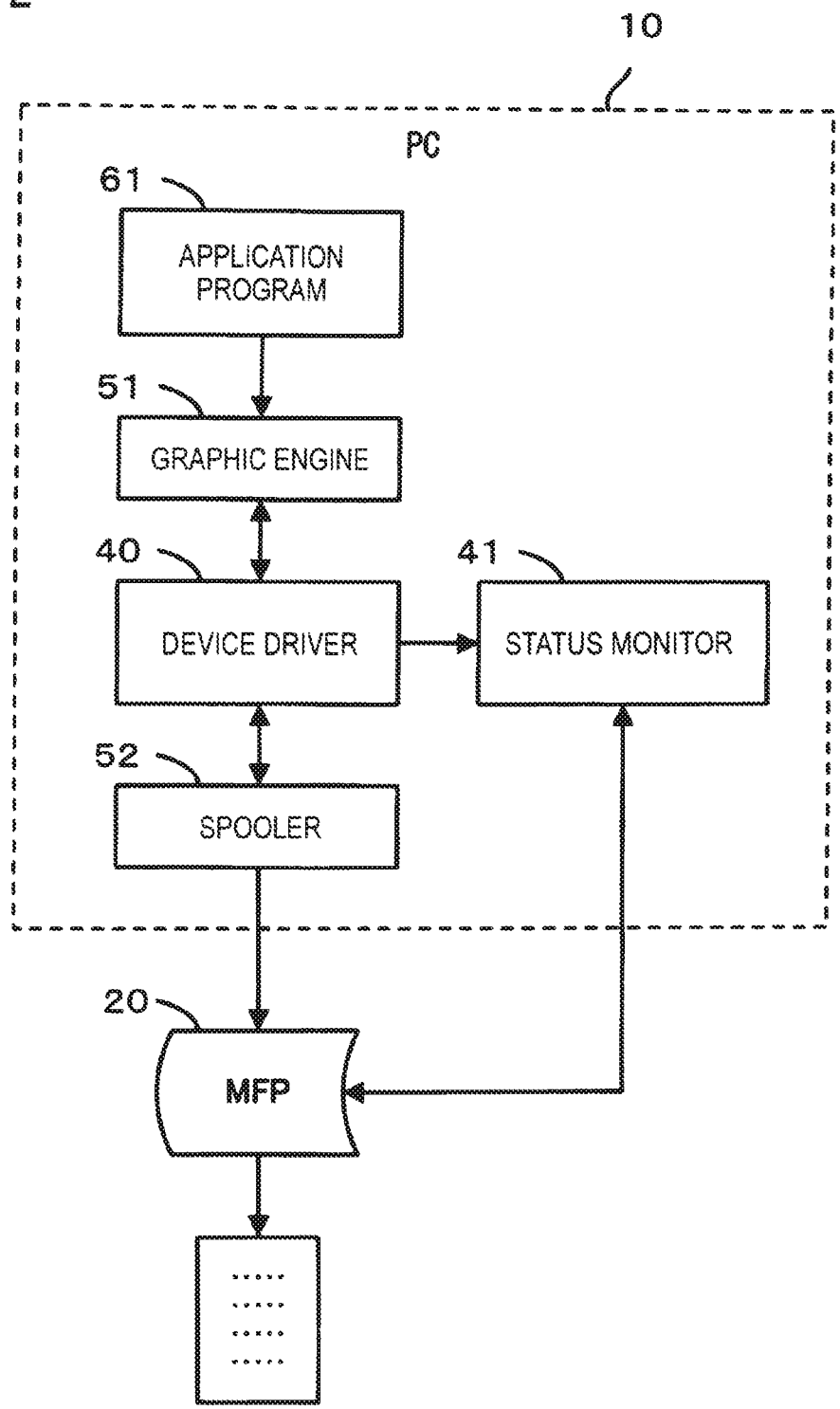
FIG. 2 is a block diagram illustrating a printing sequence of the image processing system according to the illustrative embodiment.

In FIG. 2, a device driver 40 is a printer driver for the MFP 20 and performs data processing of image data, which is a printing target, and generation processing of print data based on the processed image data. The data processing includes synthesis of a watermark, a header, a footer and the like, magnification change such as enlargement and reduction, image rotation and aggregation such as 2 in 1, 4 in 1 and the like.

Also, a status monitor 41 periodically acquires status information of all the MFPs (in this illustrative embodiment, the MFPs 20, 21, 22) that are connected to communicate with the PC 10 and displays the acquired status information so that a user can see the same. Specifically, the status monitor 41 acquires, as the status information, operating statuses (under execution, standby status, or sleep status and the like) and a type of an error when the error occurs in the MFP. In this illustrative embodiment, the status monitor 41 is provided from a device maker. However, the status monitor 41 may be provided as a part of the OS. An operating sequence of the status monitor 41 will be described later.

The graphic engine 51 is a module that controls the device driver 40. The graphic engine 51 receives a command from an application program 61 and transmits the command to the device driver 40.

The spooler 52 is a module having functions of temporarily storing the print data generated by the device driver 40 and sequentially outputting the print data to the designated MFP. In the specification, the description that 'the device driver 40 transmits the print data to the MFP 20' means that 'the device driver 40 stores the print data in the spooler 52' and does not mean that the print data is actually transmitted to the MFP 20 by the spooler 52.

When the PC 10 causes the MFP 20 to execute the printing, the application program 61 installed in the PC 10 first receives a printing instruction from the user and outputs a printing start notice, as shown in FIG. 2. Then, the graphic engine 51 that is a part of the OS receives the printing start notice and starts to acquire image data, which is a printing target, from the application program 61.

When the graphic engine 51 starts to acquire the image data, the graphic engine 51 issues a drawing command to the device driver 40. When the device driver 40 receives the drawing command, the device driver 40 generates a bitmap image (a BMP image) based on the drawing command and generates print data of a PDL format based on the BMP image.

After generating the print data, the device driver 40 stores the print data in the spooler 52. When the print data is stored in the spooler 52, the spooler 52 transmits the stored print data to the MFP 20. The MFP 20 having received the print data performs a printing operation on the basis of the print data.

Figure 3:
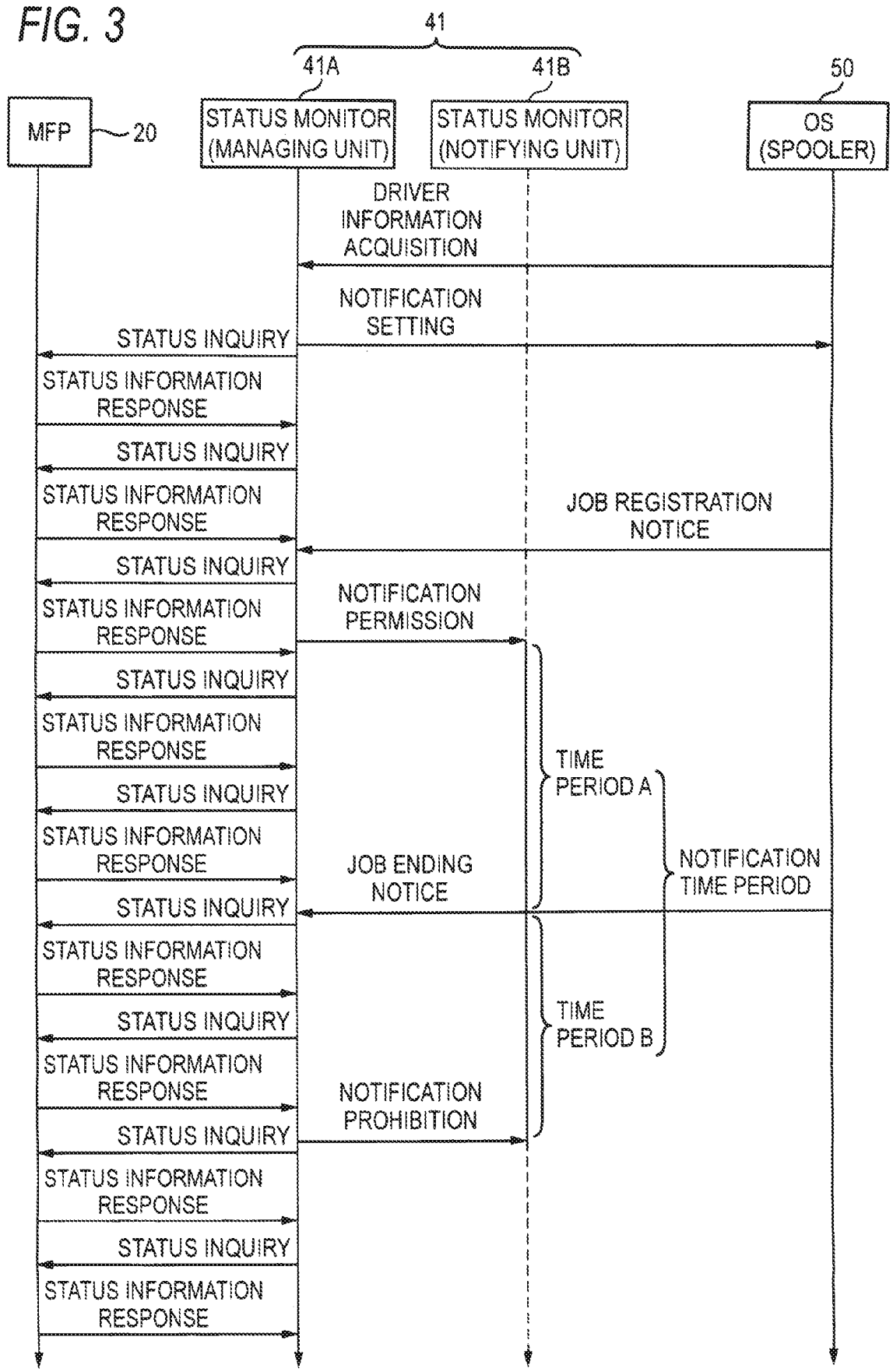
FIG. 3 is a sequence diagram illustrating a sequence of an error notification of an MFP of the image processing system according to the illustrative embodiment.

Subsequently, operations of the PC 10, which are performed when the error information of the MFP 20 is notified to the status monitor 41 in the image processing system 100 of this illustrative embodiment, are described with reference to a sequence diagram of FIG. 3. Meanwhile, in FIG. 3, the status monitor 41 is divided into a managing unit 41A that monitors a status of the MFP 20 and a notifying unit 41B that notifies the error information of the MFP 20. In the meantime, the managing unit 41A and the notifying unit 41B may be separate modules or the same modules.

In the image processing system 100 of this illustrative embodiment, when providing notification of the error information of the MFP 20 to the PC 10, the managing unit 41A first acquires driver information, which is information of the device driver that is a monitoring target, from the OS 50 upon the startup of the managing unit 41A of the status monitor 41. The driver information is stored in a setting storage area of the OS 50, such as a registry. The driver information includes a type of the driver and a type of the connection interface, for example. The driver information is stored in the setting storage area by an installer upon the installation or by the device driver upon the startup of the device driver.

Also, when there is a printer driver, the managing unit 41A of the status monitor 41 is set to notice that a job is registered when the job using the printer driver, which is a monitoring target, has been registered, to the OS 50. The notification is hereinafter referred to as 'job registration notice'. Since the error notification is performed for each device driver, the notification setting is made for each printer driver. For example, when a printer driver for the MFP 20 is installed in the PC 10, the managing unit 41A is set to issue the notification if a job using the printer driver for the MFP 20 has been registered. When the notification setting is performed, the OS 50 outputs the job registration notice at the time that a printing job is stored in the spooler 52.

Meanwhile, for a scanner driver, the scanner driver secures a storage area for storing read data and stores a reading situation in the storage area. The managing unit 41A of the status monitor 41 acquires the reading situation from the storage area of the scanner driver and detects starting and ending of a scanning job. In the meantime, the job registration notice may be output from the scanner driver to the managing unit 41A of the status monitor 41 when a scanning job is input. The descriptions of the operations of the scanning job are omitted.

After the managing unit 41A of the status monitor 41 makes the notification setting for the OS 50, the managing unit 41A periodically inquires of all devices, which are monitoring targets, about a status. That is, the managing unit 41A starts to monitor the status of the MFP 20. In the meantime, although the status monitor 41 starts to monitor the status of the MFP 20 by the managing unit 41A, the error information is not notified by the notifying unit 41B until the managing unit 41A permits the notification. The notification of the error information is not permitted at an initial state.

After that, when a printing job using the device driver of a monitoring target is registered in the PC 10, the job registration notice is output from the OS 50 to the status monitor 41. When the managing unit 41A of the status monitor 41 receives the job registration notice, the managing unit 41A permits the notifying unit 41B to provide notification of the error information until a predetermined time period elapses after the notification is received.

When the notification is permitted by the managing unit 41A, the notifying unit 41B of the status monitor 41 provides notification of the error information based on the latest status information of the MFP 20, which is acquired by the managing unit 41A. Whenever the managing unit 41A acquires the status information of the MFP 20, the notifying unit 41B provides notification of the latest error information. In the meantime, the aspect of providing notification of the error information by the notifying unit 41B is a popup display on the display unit 16, for example. In addition to this, a warning sound may be output. Also, for example, a dialogue box may be blinked.

When the printing job is over, the OS 50 outputs a job ending notice to the status monitor 41. In the meantime, the ending of the printing job means that the print data of a final page is output from the spooler 52. For this reason, there is a time lug after the job ending notice is output until the printing of a final page is completed in the MFP 20. Meanwhile, for the scanning job, the ending means that reception of scan data is completed. Therefore, the reading in the MFP 20 has been completed upon detection of the job ending.

Therefore, when the job ending notice of the printing job is received, the managing unit 41A of the status monitor 41 prohibits a notice of the status after a predetermined time period elapses from the reception of the job ending notice, considering the time lug until the printing is completed. That is, a summed time period of a time period A (first time period) after the job registration notice is received until the job ending notice is received and a time period B (second time period) after the job ending notice is received until a predetermined time period elapses is a notification time period during which notification of the error information is permitted. In the meantime, upon the ending detection of the scanning job, the reading and reception of the read data in the MFP 20 have been completed, and an error occurring after the ending detection of the scanning job has a low relativity to a job that is requested by the PC 10. For this reason, the time period B is set to be 0 second and only the time period B becomes the notification time period. When the notification is prohibited, the notifying unit 41B does not provide notification of the error information.

That is, when an error occurs in the image processing apparatus that is a monitoring target after the PC 10 registers a job, the error highly influences the job. For this reason, the error information has a high utility value for the user who uses the PC 10. On the other hand, the information of an error, which occurs while the PC 10 is not registering a job, does not have always a high utility value for the user who uses the PC 10. For this reason, the notifying unit 41B of the status monitor 41 provides notification of the error information, which is obtained from the MFP 20 during the notification time period corresponding to the time period for which the MFP 20 is executing a job after the job is registered, and does not provide notification of the error information during the other time period even when an error occurs in the MFP 20.

In the meantime, the managing unit 41A of the status monitor 41 periodically acquires the status of the image processing apparatus that is a monitoring target, regardless of whether a job is registered. Thereby, contrary to notification of the error information by the notifying unit 41B, it is possible to always display the latest status of the image processing apparatus in accordance with a request from the user.

[Operations of Status Monitor]
[Managing Processing]

Figure 4:
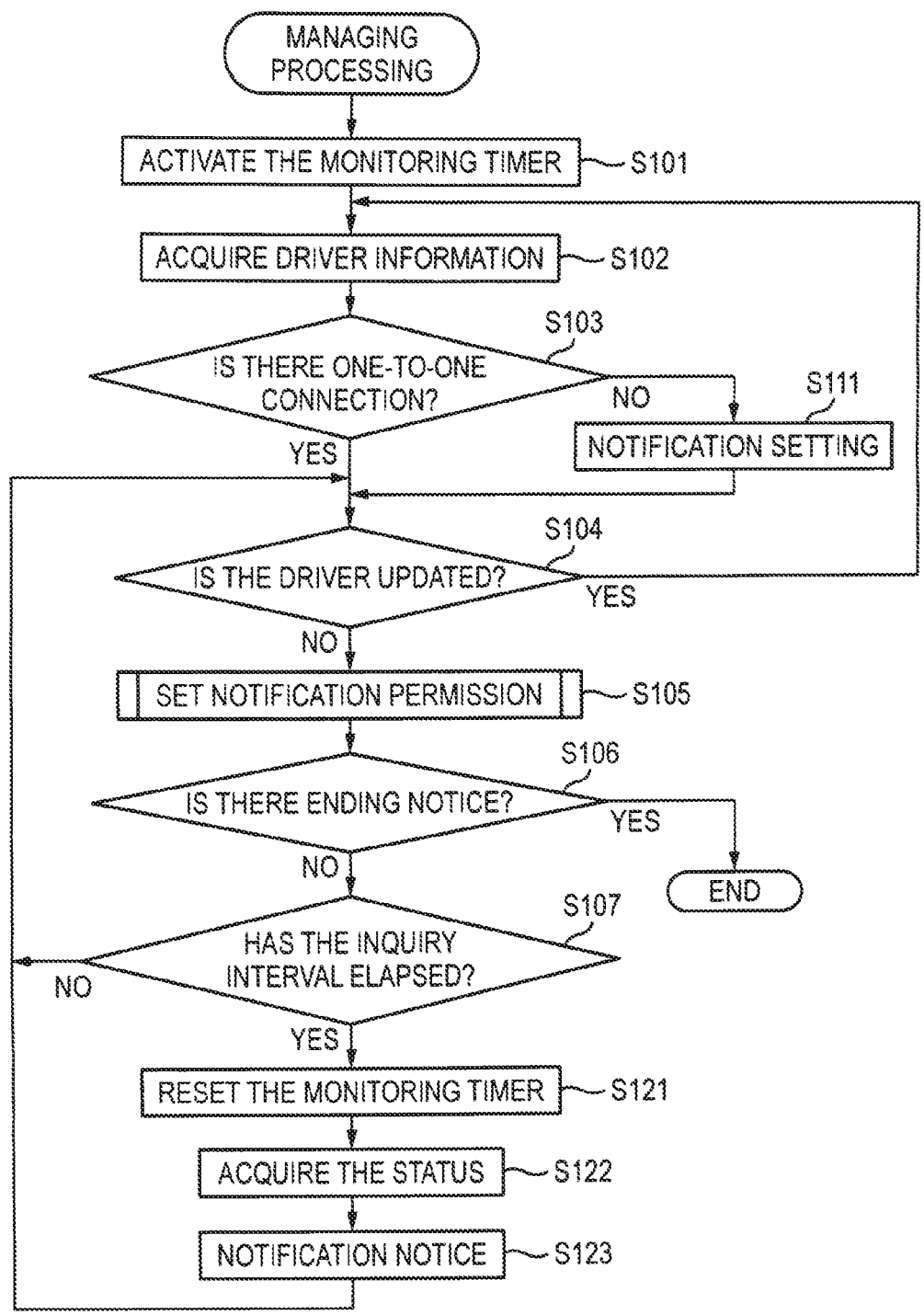
FIG. 4 is a flowchart illustrating a sequence of managing processing of a status monitor according to the illustrative embodiment.

Subsequently, managing processing that is executed by the managing unit 41A of the status monitor 41 so as to realize the error notifying sequence is described with reference to a flowchart of FIG. 4. The managing processing is executed by the CPU 11 when the status monitor 41 starts up.

In the managing processing, the CPU first initializes and activates a monitoring timer for periodically inquiring a status of a device that is a monitoring target (S101). Then, the CPU acquires the driver information of the device driver from the setting storage area of the OS 50 (S102).

Then, based on the driver information acquired in S102, the CPU determines whether the connection interface is one-to-one connection (S103). In this illustrative embodiment, the one-to-one connection corresponds to the USB interface 17. In addition to this, a one-to-one connection through a serial cable or dedicated line is also included. When the connection interface is not one-to-one connection (S103: NO), for example, when the connection interface is network connection such as Ethernet (registered trademark), the CPU sets the status monitor 41 to output the job registration notice to the OS 50 when a job using the device driver becoming a monitoring target is registered (S111).

The CPU repeats the processing of S103 and S111 and performs the processing for all the device drivers that are stored in the driver information acquired in S102. For example, when the printer driver of the MFP 20 and the printer driver of the MFP 22 are monitoring targets, since the MFP 20 is connected by the network interface 18 and the MFP 22 is connected by the USB interface 17, the job registration notice is performed for the status monitor 41 upon the registration of the job using the printer driver of the MFP 20.

After the notification setting for the respective device drivers, the CPU determines whether the driver information is updated (S104). That is, after starting the managing processing, the CPU determines whether the device driver becoming a monitoring target is added or deleted. When the driver information is updated (S104: YES), the CPU proceeds to S102 and again performs the notification setting.

When the driver information is not updated (S104: NO), the CPU executes notification-permission setting processing for setting notification-permission of the error information (S105). Here, the notification-permission setting processing of S105 is described with reference to a flowchart of FIG. 5.

In the notification-permission setting processing, the CPU first determines whether there is the job registration notice (S151). When there is the job registration notice (S151: YES), the CPU permits the notification of the error information (S161). Thereby, the notification of the error information by the notifying unit 41B is permitted. The information indicating whether there is the notification-permission is stored in a storage means that can be commonly used by the managing unit 41A and the notifying unit 41B, for example, a registry or file. When the notification of the error information is permitted, the notifying unit 41B provides notification of the error information, based on the status information of the device. The processing of the notifying unit 41B will be described later. On the other hand, when there is no job registration notice (S151: NO), the notification of the error information is not permitted.

After S161 or when there is no job registration notice (S151: NO), the CPU determines whether there is the job ending notice (S152). When there is the job ending notice (S152: YES), the CPU acquires a type of the job that is a notice target (S171). Then, based on the type of the job, the CPU determines ending time of the notification time period (S172). That is, the CPU determines the time period B of FIG. 3. Regarding a method of determining the ending time of the notification time period in S172, when a job is the printing job, the CPU sets time that is prescribed considering the time lug until the printing is completed, for example. On the other hand, when a job is the scanning job, the CPU sets the time B to be zero (0) because the scan is completed at the time that the reception of the read data is completed. After S172, the CPU initializes and activates a notification timer that is a timer for notification time period (S173).

After S173 or when there is no job ending notice (S152: NO), the CPU determines whether the notification time period has elapsed (S153). Specifically, in S153, the CPU determines that the time period B has elapsed i.e., the notification time period has elapsed when the notification timer activated in S173 reaches the ending time or longer determined in S172. On the other hand, when the notification timer activated in S173 does not exceed the ending time or the notification time period is not set, i.e., while the notification of the error information is prohibited, the CPU determines in S153 that the notification time period has not elapsed.

When the notification time period has elapsed (S153: YES), the CPU prohibits the notification of the error information (S181). Then, the CPU stops the notification timer (S182). After S182 or when the notification time period has not elapsed (S153: NO), the CPU ends the notification-permission setting processing. In the meantime, the descriptions of the notification-permission setting processing relate to the notification-permission setting of the printer driver. For the scanner driver, the CPU determines in S151 whether the start of the scanning job is detected and determines in S152 whether the ending of the scanning job is detected.

Figure 5:
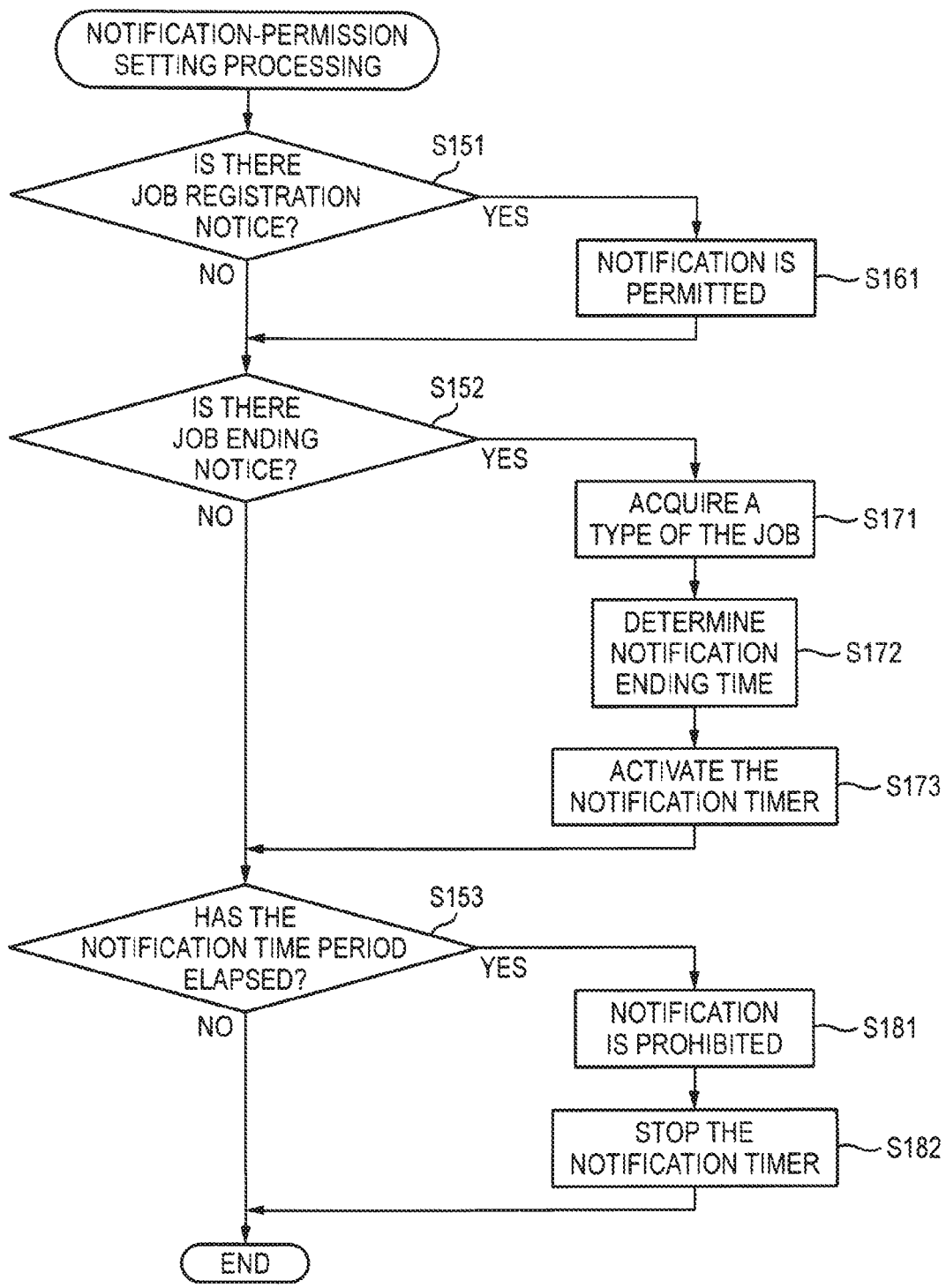
FIG. 5 is a flowchart illustrating a sequence of notification-permission setting processing (a first mode) of the status monitor according to the illustrative embodiment.

Meanwhile, in the notification-permission setting processing (a first mode) shown in FIG. 5, when the job ending notice is received, the CPU determines the notification time period by determining the time period B. That is, in FIG. 3, the sum of the time period A and the time period B is the notification time period. However, the notification time period may be determined when the job registration notice is received, i.e., when the notification of the error information is permitted. The notification-permission setting processing (a second mode) of this case is shown in FIG. 6.

Figure 6:
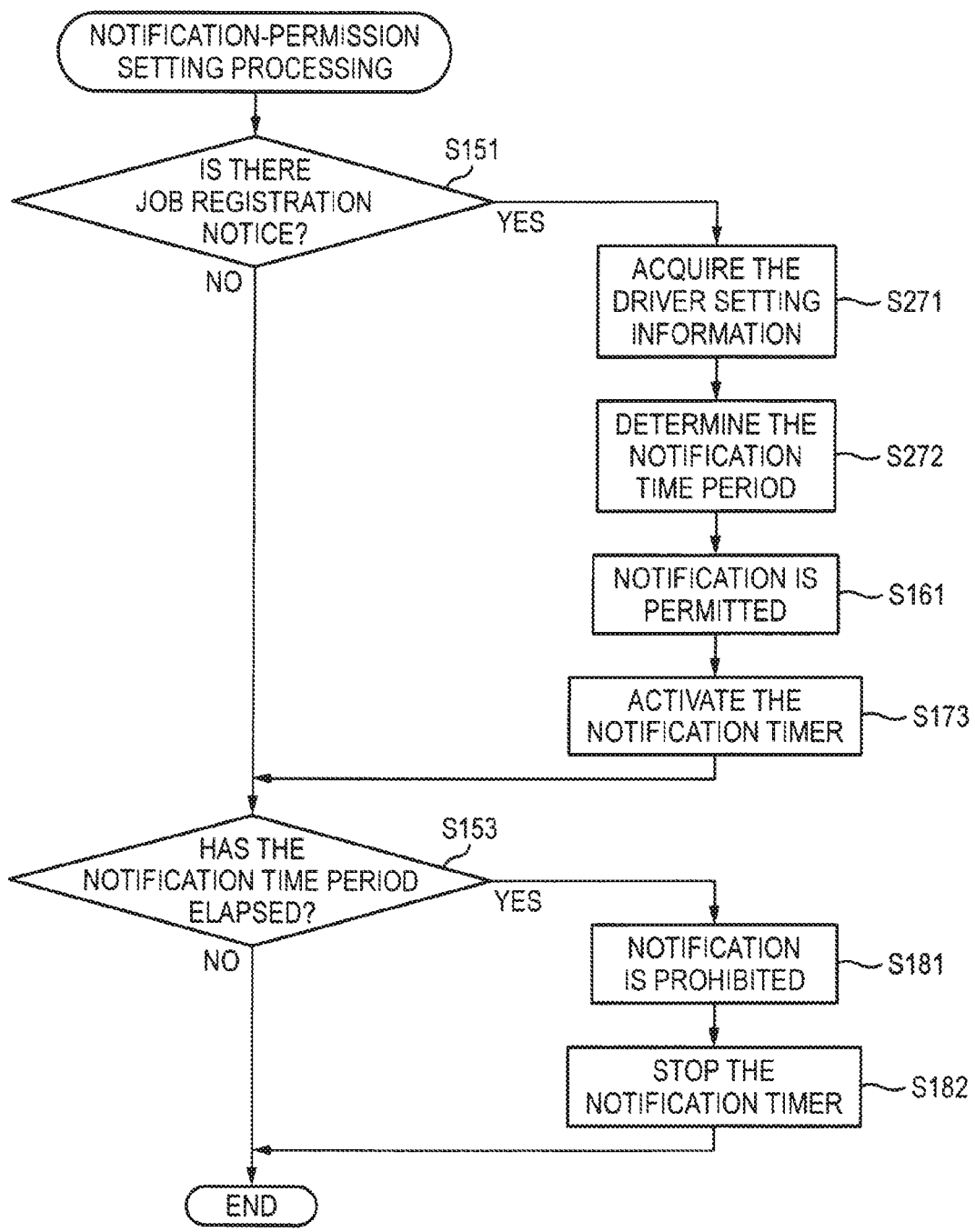
FIG. 6 is a flowchart illustrating a sequence of notification-permission setting processing (a second mode) of the status monitor according to the illustrative embodiment.

In the notification-permission setting processing shown in FIG. 6, when there is the job registration notice (S151: YES), the CPU acquires setting information of the device driver that is used by the corresponding job (S271) and determines an ending time of the notification time period on the basis of the setting information of the device driver (S272). Regarding a method of determining the ending time of the notification time period in S272, the notification time period is set to be longer in proportion to the number of sheets to be printed "n". Also, for a color printing, the notification time period is set to be longer than a monochrome printing. Alternatively, when the number of sheets to be color-printed is a threshold or larger, the CPU adds time of position deviation correction to the notification time period. Also, for a duplex printing, the notification time period is set to be longer than one-side printing. That is, in S272, the CPU determines the notification time period, based on an attribute of the job obtained from the setting information of the device driver.

After S272, the CPU permits the notification of the error information (S161) and initializes and activates the notification timer (S173). After S173 or when there is no job registration notice (S151: NO), the CPU determines whether the notification time period has elapsed (S153). When the notification time period has elapsed (S153: YES), the CPU prohibits the notification of the error information (S181) and stops the notification timer (S182).

That is, in the notification-permission setting processing of the second mode shown in FIG. 6, the notification time period is set irrespective of the job ending notice. For this reason, the output of the job ending notice is not required and the processing becomes simpler than the notification-permission setting processing of the first mode shown in FIG. 5. On the other hand, in the second mode, since the ending time of the notification time period is determined irrespective of the job ending notice, there is a risk that the notification time period will expire before the job is over. For this reason, the first mode can more certainly secure the notification time period until the job is completed.

Meanwhile, in the first mode, the notification time period is varied depending on the type of the job. However, the notification time period may be fixed. Also, the time period B may not be included in the notification time period and the notification time period may expire when the job ending notice is received, i.e., only the time period A may be set as the notification time period. Also, like the second mode, the time period B may be varied depending on the setting of the device driver. Also, in the second mode, the notification time period is varied depending on the setting of the device driver. However, the notification time period may be fixed. Also, like the first mode, the notification time period may be varied depending on the type of the job.

Returning to FIG. 4, after the notification-permission setting processing in S105, the CPU determines whether there is an ending notice of ending the status monitor 41 (S106). When there is the ending notice (S106: YES), the CPU ends the managing processing.

When there is no ending notice (S106: NO), the CPU determines whether an inquiry interval of the status of the device being a monitoring target has elapsed (S107). Specifically, in S107, when the monitoring timer activated in S101 reaches predetermined time or longer, the CPU determines that the inquiry interval has elapsed. When the inquiry interval has not elapsed (S107: NO), the CPU proceeds to S104 and repeats the determination after S104.

When the inquiry interval has elapsed (S107: YES), the CPU resets the monitoring timer to an initial value and reactivates the same (S121). Also, the CPU inquires of the device being a monitoring target about a status thereof and acquires the status information of each device (S122). After that, the CPU outputs a notification notice to the notifying unit 41B of the status monitor 41 (S123). After S123, the CPU proceeds to S104 and waits for the inquiry interval to elapse. Whenever the inquiry interval has elapsed, the CPU repeats the processing after S121.

[Notification Processing]

Figure 7:
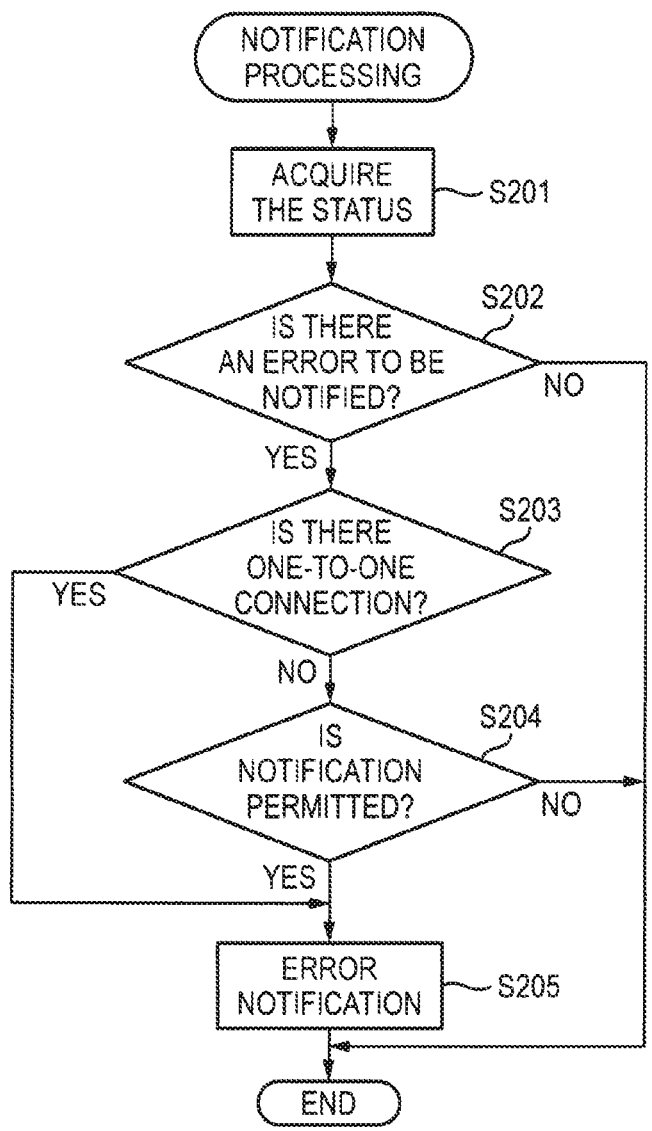
FIG. 7 is a flowchart illustrating a sequence of notification processing of the status monitor according to the illustrative embodiment.

Subsequently, notification processing that is executed by the notifying unit 41B of the status monitor 41 so as to implement the error notifying sequence is described with reference to a flowchart of FIG. 7. The notification processing is executed by the CPU 11 when the notification notice (refer to S123 in the managing processing of FIG. 4) is output from the managing unit 41A.

In the notification processing, the CPU acquires the latest status information acquired by the managing unit 41A (S201). Then, the CPU determines whether the error information included in the status information includes an error to be provided in a notification (S202). For example, in S202, the status information irrelevant to the error, such as standby status, slip status and the like, is not included in the error provided in a notification. Also, for example, when the printer driver of the MFP 20 is a monitoring target, the error information relating to the scanner and FAX communication has a low utility value even though the error information is the error information of the MFP 20. That is, the CPU determines that the error information irrelevant to the job for which the job registration notice is issued is not a target to be provided in a notification. Also, when the printer drivers of the MFP 20 and the MFP 22 are monitoring targets and a printing job is issued for the MFP 20, the error information of the MFP 22 has a low utility value. That is, when a plurality of devices is monitoring targets, the CPU determines that the error information of a device, except for a device that is used by a job for which the job registration notice is issued, is not a target to be provided in a notification. When it is determined that there is no error to be provided in a notification (S202: NO), the CPU ends the notification processing without providing a notification of the error information.

When it is determined that there is an error to be provided in a notification (S202: YES), the CPU determines whether the connection interface to the device in which the error to be provided in a notification occurs is one-to-one connection (S203). When the connection interface is one-to-one connection (S203: YES), there is a high possibility that the occurring error is a job input from another PC 10. For this reason, the CPU provides a notification of the error information, irrespective of whether there is the notification-permission (S205).

On the other hand, when the connection interface is not one-to-one connection (S203: NO), the CPU determines whether the error notification is permitted in the managing unit 41A (S204). Specifically, the CPU reads out the information indicating whether there is the notification-permission, which is stored in S161 or S181 of the managing processing of the managing unit 41A. When the notification is permitted (S204: YES), the CPU provides a notification of the error information (S205) and ends the notification processing. On the other hand, when the notification is not permitted (S204: NO), the CPU ends the notification processing without providing notification of the error information.

As specifically described above, there is a high possibility that an error, which occurs in the device being a monitoring target within the predetermined time period after the PC 10 receives the execution request of the job, is an error relating to the job requested by the PC 10. On the other hand, there is a high possibility that an error, which occurs in the device being a monitoring target for a time period other than the predetermined time period, is an error irrelevant to the PC 10. For this reason, the status monitor 41 of this illustrative embodiment provides a notification of the error information if the error occurs in the predetermined time period (in the notification time period). Thereby, it is possible to expect the error notification to have a high utility value.

In the meantime, the above illustrative embodiment is just exemplary and is not construed to limit this disclosure. Accordingly, this disclosure can be variously improved and modified without departing from the scope of this disclosure. For example, regarding the MFP, any device having an image processing function is possible and a printer, a scanner, a copier and a FAX apparatus can be also applied. Also, regarding the PC, any apparatus that inputs an image processing job to the image processing apparatus is possible and a smart phone and a PDA can be also applied.

Also, in the above illustrative embodiment, the managing unit 41A of the status monitor 41 periodically acquires the status information of the MFP 20, irrespective of the notification time period. However, the managing unit 41A may acquire the status information only during the notification time period.

Also, in the above illustrative embodiment, the error information irrelevant to the type of the job for which the job registration notice is issued and the error information of the device other than the device that is used by the job for which the job registration notice is issued are not determined as an error that is to be provided in a notification in S202 and thus are not provided in a notification, but it may be provided in a notification. In this case, the error information that is determined as an error not to be provided in a notification has a lower utility value, compared to the error information that is determined as an error to be provided in a notification. Therefore, the error information that is determined as an error not to be provided in a notification may be set to have a lower degree for providing a notification, compared to the error information that is determined as an error to be provided in a notification, and may be provided in a notification in distinction from the error to be provided in a notification. The level of the degree of the notification may be implemented by whether or not a popup display, whether or not a blink display, whether or not a warning sound and a size of a message box.

Also, in the above illustrative embodiment, the notifying unit 41B of the status monitor 41 is enabled to provide notification of the error. However, this disclosure is not limited thereto. For example, a mail may be transmitted. Also, the other applications having a display function (for example, a browser, a status monitor that is managed by the OS, and the like) may display the error, for example.

Also, the processing disclosed in the above illustrative embodiment may be executed by hardware such as a single CPU, a plurality of CPUs, an ASIC and the like or a combination thereof. Also, the processing disclosed in the above illustrative embodiment may be implemented by a variety of aspects such as a recording medium having a program for executing the processing recorded therein, a method and the like.

What is claimed is:

1. An information processing device, comprising:
a processing unit;
a memory storing a program that, when executed by the processing unit, causes the information processing unit to perform:
  a status display application configured to display a status of an image processing device; and
  a bidirectional communication application configured to operate as a service application and be capable of performing bidirectional communication with the image processing device;
  executing a prevention mode, in which notification of an error is prevented and the notification of the error is not provided even if error information is received in the prevention mode;
  switching, in response to receiving a job, into a permission mode, in which notification of an error is permitted and the notification of the error is provided if error information is received, from the prevention mode;
  executing, in response to receiving error information in the permission mode, a notification process notifying of an error; and
  returning, when a predetermined time elapses from the switching into the permission mode, to the prevention mode,
  wherein the status display application issues a request to obtain a status of the image processing device together with an identification information of the image processing device to the bidirectional communication application, and
  wherein the bidirectional communication application specifies a target image processing device from which to obtain the status based on the identification information of the image processing device, transmits a request to obtain the status to the target image processing device, and transmits to the status display application a status that is sent back from the image processing device in response to the request to obtain.

2. The information processing device according to claim 1, wherein communication between the status display application and the bidirectional communication application is performed by local communication.

3. A method of controlling an information processing device, the method comprising:
  displaying a status of an image processing device; and
  operating as a service application and being capable of performing bidirectional communication with the image processing device;
  executing a prevention mode, in which notification of an error is prevented and the notification of the error is not provided even if error information is received in the prevention mode;
  switching, in response to receiving a job, into a permission mode, in which notification of an error is permitted and the notification of the error is provided if error information is received, from the prevention mode;
  executing, in response to receiving error information in the permission mode, a notification process notifying of an error; and
  returning, when a predetermined time elapses from the switching into the permission mode, to the prevention mode,
  wherein, in the displaying, a request to obtain a status of the image processing device is issued together with identification information of the image processing device to the service application, and
  wherein the service application specifies a target image processing device from which to obtain the status based on the identification information of the image processing device, transmits a request to obtain the status to the target image processing device, and transmits a status that is sent back from the image processing device in response to the request to obtain.

4. A non-transitory computer-readable storage medium storing a program for causing a computer to execute a method of controlling an information processing device, the method comprising:
  displaying a status of an image processing device;
  operating as a service application and being capable of performing bidirectional communication with the image processing device;
  executing a prevention mode, in which notification of an error is prevented and the notification of the error is not provided even if error information is received in the prevention mode;
  switching, in response to receiving a job, into a permission mode, in which notification of an error is permitted and the notification of the error is provided if error information is received, from the prevention mode;
  executing, in response to receiving error information in the permission mode, a notification process notifying of an error; and
  returning, when a predetermined time elapses from the switching into the permission mode, to the prevention mode,
  wherein, in the displaying, a request to obtain a status of the image processing device is issued together with identification information of the image processing device to the service application, and
  wherein the service application specifies a target image processing device from which to obtain the status based on the identification information of the image processing device, transmits a request to obtain the status to the target image processing device, and transmits a status that is sent back from the image processing device in response to the request to obtain.

5. The information processing device according to claim 1, wherein the program further includes:
  a first software that transmits an image processing job to the image processing device; and
  a plurality of second software that causes the first software to transmit the image processing job installed in the information processing device, and the plurality of second software as part of an image processing system to conform to a specification of the first software,
  wherein the program, when executed by the processing unit, causes the information processing device to perform:
    acquiring monitoring target device information stored in the information processing device, the monitoring target device information indicating which device among a plurality of devices is a monitoring target device of the status display;
    monitoring outputting of target notification information by the first software, wherein the target notification information is output by the first software when job data that causes the image processing device corresponding to the second software to execute an image processing job is input to the first software by the second software, wherein the second software inputs, to the first software, job data that causes the image processing device corresponding to the second software in response to inputting of a job execution instructing operation onto a user interface, wherein the job execution instructing operation instructs the image processing job to execute the image processing job, via the image processing system, to conform to the specification of the first software, receiving, from the monitoring target device via a connection interface, periodically, status information, wherein the status display is operated in one of a notification mode and a non-notification mode, and the status display is in the non-notification mode before the first software outputs the target notification information;

switching, in response to receiving job notification information from the first software in a state of the non-notification mode, into the notification mode;

determining, when the status information received from the monitoring target device includes error information indicating that the monitoring target device is in an error state, whether the status display is in the notification mode or the non-notification mode;

executing, in response to determining that the status display is in the notification mode, a notification process notifying of an error indicated by error information;

preventing, in response to determining that the status display is in the non-notification mode, the notification process; and switching, when a predetermined time elapses from switching into the notification mode, into the non-notification mode, wherein the non-notification mode corresponds to a first period in which job data that causes the image processing device corresponding to the second software to execute the image processing job is not input to the first software by the second software and a second period after a predetermined time elapses from switching into the notification mode in response to the job data being input to the first software by the second software and the target notification information.

6. The method of controlling the information processing device according to claim 3, the information processing device further including: a first software that transmits an image processing job to the image processing device; and a plurality of second software that causes the first software to transmit the image processing job installed in the information processing device, and the plurality of second software as part of an image processing system to conform to a specification of the first software, wherein the method further comprises:

acquiring monitoring target device information stored in the information processing device, the monitoring target device information indicating which device among a plurality of devices is a monitoring target device of the status display;

monitoring outputting of target notification information by the first software, wherein the target notification information is output by the first software when job data that causes the image processing device corresponding to the second software to execute an image processing job is input to the first software by the second software, wherein the second software inputs, to the first software, job data that causes the image processing device corresponding to the second software in response to inputting of a job execution instructing operation onto a user interface, wherein the job execution instructing operation instructs the image processing job to execute the image processing job, via the image processing system, to conform to the specification of the first software, receiving, from the monitoring target device via a connection interface, periodically, status information, wherein the status display is operated in one of a notification mode and a non-notification mode, and the status display is in the non-notification mode before the first software outputs the target notification information;

switching, in response to receiving job notification information from the first software in a state of the non-notification mode, into the notification mode;

determining, when the status information received from the monitoring target device includes error information indicating that the monitoring target device is in an error state, whether the status display is in the notification mode or the non-notification mode;

executing, in response to determining that the status display is in the notification mode, a notification process notifying of an error indicated by error information;

preventing, in response to determining that the status display is in the non-notification mode, the notification process; and switching, when a predetermined time elapses from switching into the notification mode, into the non-notification mode, wherein the non-notification mode corresponds to a first period in which job data that causes the image processing device corresponding to the second software to execute the image processing job is not input to the first software by the second software and a second period after a predetermined time elapses from switching into the notification mode in response to the job data being input to the first software by the second software and the target notification information.

7. The non-transitory computer-readable storage medium storing the program according to claim 4, the information processing device further including: a first software that transmits an image processing job to the image processing device; and a plurality of second software that causes the first software to transmit the image processing job installed in the information processing device, and the plurality of second software as part of an image processing system to conform to a specification of the first software, wherein the method further comprises:

acquiring monitoring target device information stored in the information processing device, the monitoring target device information indicating which device among a plurality of devices is a monitoring target device of the status display;

monitoring outputting of a target notification information by the first software, wherein the target notification information is output by the first software when job data that causes the image processing device corresponding to the second software to execute an image processing job is input to the first software by the second software, wherein the second software inputs, to the first software, job data that causes the image processing device corresponding to the second software in response to inputting of a job execution instructing operation onto a user interface, wherein the job execution instructing operation instructs the image processing job to execute the image processing job, via the image processing system, to conform to the specification of the first software, receiving, from the monitoring target device via a connection interface, periodically, status information, wherein the status display is operated in one of a notification mode and a non-notification mode, and the status display is in the non-notification mode before the first software outputs the target notification information;

switching, in response to receiving job notification information from the first software in a state of the non-notification mode, into the notification mode;

determining, when the status information received from the monitoring target device includes error information indicating that the monitoring target device is in an error state, whether the status display is in the notification mode or the non-notification mode;

executing, in response to determining that the status display is in the notification mode, a notification process notifying of an error indicated by error information;

preventing, in response to determining that the status display is in the non-notification mode, the notification process; and switching, when a predetermined time elapses from switching into the notification mode, into the non-notification mode, wherein the non-notification mode corresponds to a first period in which job data that causes the image processing device corresponding to the second software to execute the image processing job is not input to the first software by the second software and a second period after a predetermined time elapses from switching into the notification mode in response to the job data being input to the first software by the second software and the target notification information.

* * * * *

UNITED STATES PATENT AND TRADEMARK OFFICE
CERTIFICATE OF CORRECTION

| | |
|---|---|
| PATENT NO. | : 11,392,439 B2 |
| APPLICATION NO. | : 16/752207 |
| DATED | : July 19, 2022 |
| INVENTOR(S) | : Takashi Sugiyama et al. |

It is certified that error appears in the above-identified patent and that said Letters Patent is hereby corrected as shown below:

In the Claims

Column 11, Claim 1, Line 5:
Please delete "the information processing unit" and insert --the information processing device--

Signed and Sealed this
Twenty-fourth Day of January, 2023

Katherine Kelly Vidal
*Director of the United States Patent and Trademark Office*